(12) United States Patent
Ozor et al.

(10) Patent No.: US 8,136,123 B2
(45) Date of Patent: Mar. 13, 2012

(54) SYSTEM AND COMPUTER PROGRAM PRODUCT FOR PERFORMING BULK OPERATIONS ON TRANSACTIONAL ITEMS

(75) Inventors: Timothy A. Ozor, Austin, TX (US); Gregory S. Hilton, Austin, TX (US)

(73) Assignee: Open Text S.A., Luxembourg (LU)

( * ) Notice: Subject to any disclaimer, the term of this patent is extended or adjusted under 35 U.S.C. 154(b) by 0 days.

(21) Appl. No.: 13/046,418

(22) Filed: Mar. 11, 2011

(65) Prior Publication Data

US 2011/0161986 A1    Jun. 30, 2011

Related U.S. Application Data

(63) Continuation of application No. 12/272,139, filed on Nov. 17, 2008, now Pat. No. 7,908,608, which is a continuation of application No. 10/434,937, filed on May 9, 2003, now Pat. No. 7,464,385.

(51) Int. Cl.
*G06F 13/00* (2006.01)
(52) U.S. Cl. . 719/316; 719/328; 709/203; 707/999.001; 707/999.1
(58) Field of Classification Search ............... 719/316, 719/328; 709/203; 707/999.001, 999.1
See application file for complete search history.

(56) References Cited

U.S. PATENT DOCUMENTS

| | | | |
|---|---|---|---|
| 5,418,888 A | 5/1995 | Alden | |
| 5,634,124 A | 5/1997 | Khoyi et al. | |
| 5,806,066 A | 9/1998 | Golshani et al. | |
| 6,006,234 A | 12/1999 | Govindarajan et al. | |
| 6,052,691 A | 4/2000 | Ardoin et al. | |
| 6,065,011 A | 5/2000 | Bulusu et al. | |
| 6,233,730 B1 | 5/2001 | Todd et al. | |
| 6,292,804 B1 | 9/2001 | Ardoin et al. | |
| 6,353,860 B1 | 3/2002 | Hare et al. | |
| 6,477,628 B1 * | 11/2002 | Bish et al. | 711/162 |
| 6,490,255 B1 | 12/2002 | Kiriha et al. | |
| 6,772,168 B2 | 8/2004 | Ardoin et al. | |
| 6,795,848 B1 | 9/2004 | Border et al. | |
| 6,834,382 B2 | 12/2004 | Marso et al. | |
| 6,857,053 B2 | 2/2005 | Bolik et al. | |
| 6,904,460 B1 | 6/2005 | Raciborski et al. | |
| 6,910,040 B2 | 6/2005 | Emmick et al. | |
| 6,938,260 B1 | 8/2005 | Wason | |
| 6,965,872 B1 | 11/2005 | Grdina | |
| 7,092,955 B2 | 8/2006 | Mah et al. | |
| 7,096,216 B2 | 8/2006 | Anonsen | |

(Continued)

OTHER PUBLICATIONS

"The Castor Project," Feb. 12, 2003, ExoLab Group, 1999-2003, pp. 1-3, printed Feb. 24, 2003.

(Continued)

*Primary Examiner* — Andy Ho
(74) *Attorney, Agent, or Firm* — Sprinkle IP Law Group

(57) ABSTRACT

Bulk operations on a large number of items may be processed by a computer with a reduced likelihood of exceeding a timing or hardware limitation of a system. An instruction or its related information can be examined to determine if the instruction may potentially involve a large number of items. If so, the instruction may be passed to a bulk operations manager software component to determine the number of items involved. The bulk operations manager software component can break down the operation into smaller groups of items. Operations can be performed on each of the smaller groups of objects. The changes can be transparent to a developer writing code or a computer generating code to perform a specific operation.

20 Claims, 5 Drawing Sheets

U.S. PATENT DOCUMENTS

| | | | |
|---|---|---|---|
| 7,213,062 | B1 | 5/2007 | Raciborski et al. |
| 7,249,197 | B1 | 7/2007 | Roestenburg et al. |
| 7,290,007 | B2 | 10/2007 | Farber et al. |
| 7,428,723 | B2 | 9/2008 | Greene et al. |
| 7,464,385 | B1 | 12/2008 | Ozor et al. |
| 7,680,818 | B1 | 3/2010 | Fan et al. |
| 7,908,608 | B2 | 3/2011 | Ozor et al. |
| 7,941,453 | B1 | 5/2011 | Scheevel et al. |
| 2001/0029604 | A1 | 10/2001 | Dreyband et al. |
| 2001/0049732 | A1 | 12/2001 | Raciborski et al. |
| 2001/0051980 | A1 | 12/2001 | Raciborski et al. |
| 2001/0054095 | A1 | 12/2001 | Kampe et al. |
| 2002/0055966 | A1 | 5/2002 | Border et al. |
| 2002/0099684 | A1 | 7/2002 | Ardoin et al. |
| 2002/0194201 | A1 | 12/2002 | Wilbanks et al. |
| 2003/0018616 | A1 | 1/2003 | Wilbanks et al. |
| 2003/0110448 | A1 | 6/2003 | Haut et al. |
| 2003/0185432 | A1 | 10/2003 | Hong et al. |
| 2004/0015487 | A1 | 1/2004 | Lin et al. |
| 2004/0205493 | A1 | 10/2004 | Simpson et al. |
| 2006/0265257 | A1 | 11/2006 | Pulfer |

OTHER PUBLICATIONS

Toplink increases developer productivity and accelerator application performance by providing the integration between Java applications and relational data, WebGain, Inc., Santa Clara, CA, 2000-2002, 1 pg. printed Feb. 24, 2003.

Toplink, Version 4.0, 2001, 23 pages, WebGain, Inc., Santa Clara, CA.

Office Action for U.S. Appl. No. 10/434,935, mailed May 29, 2007, 11 pgs.

Office Action for U.S. Appl. No. 10/434,935, mailed Nov. 16, 2007, 18 pgs.

Office Action for U.S. Appl. No. 10/434,935, mailed Apr. 14, 2008, 19 pgs.

Office Action for U.S. Appl. No. 10/434,935, mailed Oct. 1, 2008, 22 pgs.

Office Action for U.S. Appl. No. 10/434,935, mailed Mar. 2, 2009, 22 pgs.

Office Action for U.S. Appl. No. 10/434,935, mailed Sep. 11, 2009, 12 pgs.

Office Action for U.S. Appl. No. 10/434,935, mailed Jan. 29, 2010, 17 pages.

Office Action for U.S. Appl. No. 10/434,935, mailed Aug. 12, 2010, 15 pgs.

Office Action for U.S. Appl. No. 10/434,937, mailed Mar. 19, 2007, 10 pgs.

Office Action for U.S. Appl. No. 10/434,937, mailed Apr. 8, 2008, 9 pgs.

Office Action for U.S. Appl. No. 12/272,139, mailed Jun. 17, 2010, 11 pgs.

Notice of Allowance for U.S. Appl. No. 12/272,139, mailed Nov. 10, 2010, 8 pgs.

Notice of Allowance for U.S. Appl. No. 10/434,935, mailed Jan. 19, 2011, 18 pgs.

\* cited by examiner

SYSTEM AND COMPUTER PROGRAM PRODUCT FOR PERFORMING BULK OPERATIONS ON TRANSACTIONAL ITEMS

CROSS-REFERENCE TO RELATED APPLICATIONS

This application is a continuation of U.S. patent application Ser. No. 12/272,139, filed Nov. 17, 2008, now U.S. Pat. No. 7,908,608, entitled "METHOD AND SYSTEM FOR PERFORMING BULK OPERATIONS ON TRANSACTIONAL ITEMS," which is a continuation of U.S. patent application Ser. No. 10/434,937, filed May 9, 2003, now U.S. Pat. No. 7,464,385, entitled "METHOD AND SYSTEM FOR PERFORMING BULK OPERATIONS ON TRANSACTIONAL ITEMS." This application relates to U.S. patent application Ser. No. 10/434,935, filed May 9, 2003, now allowed, entitled "METHOD AND SYSTEM FOR DEPLOYMENT OF CONTENT USING COMPOUND OBJECTS." All applications listed in this paragraph are fully incorporated by reference herein.

FIELD OF THE INVENTION

This invention relates in general to methods and systems for performing operations, and more particularly, to a system and computer program product for performing bulk operations on a large number of transactionally related items.

DESCRIPTION OF THE RELATED ART

Content management at web sites is becoming increasingly complicated as more content is used at those web sites. Content may be acted upon as a project. Each project, which can be represented by a software object, can include other software objects that reference many sub-objects. A single operation, such as deleting or promoting a project, may involve well over 10,000 different objects and sub-objects. Some programs may allow only 30 seconds to perform an operation. After that time, the application server may respond with an error message that the operation could not be completed within the allotted time.

As one attempt to solve the problem, the time allowed to perform an operation may be extended, but a different problem may exist. For example, a database server may return a message that too many files are involved. Other attempts to modify hardware or time limits on software programs may not be sufficient as the number of files increases (100,000 objects and sub-objects instead of 10,000).

A brute force method may be used where the same command is repeatedly sent by a human. In some instances, such as deleting, the operation may be completed, but only after the operation is attempted a number of times. In other instances, the method may not work. For example, if all files within a project are to be promoted during the same operation, the files may not be transferred because the system may revert back to the state the files were in before the operation was attempted if the operation cannot be successfully completed. The brute force method is not a solution; it requires manual intervention, and then even with that, it may still not be enough.

SUMMARY OF THE INVENTION

Bulk operations on a large number of items may be processed by a computer with a reduced likelihood of exceeding a timing or hardware limitation of a system. An instruction or its related information can be examined to determine if the instruction may potentially involve a large number of items. If so, the instruction may be passed to a bulk operations manager software component to determine the number of items involved. The bulk operations manager software component can break down the operation into smaller groups of items. Operations may be performed on those smaller groups of items. The changes can be transparent to a developer writing code or a computer generating code to perform a specific operation.

In one set of embodiments, a method of performing an operation on a software object can comprise receiving an instruction to perform an operation on the software object that comprises sub-objects. The method can also comprise creating groups of the sub-objects and performing the operation on each of the groups. In another set of embodiments, a data processing system readable medium can be coded to include instructions for carrying out the method.

The foregoing general description and the following detailed description are exemplary and explanatory only and are not restrictive of the invention, as defined in the appended claims.

BRIEF DESCRIPTION OF THE DRAWINGS

The present invention is illustrated by way of example and not limitation in the accompanying figures.

Figure 1:
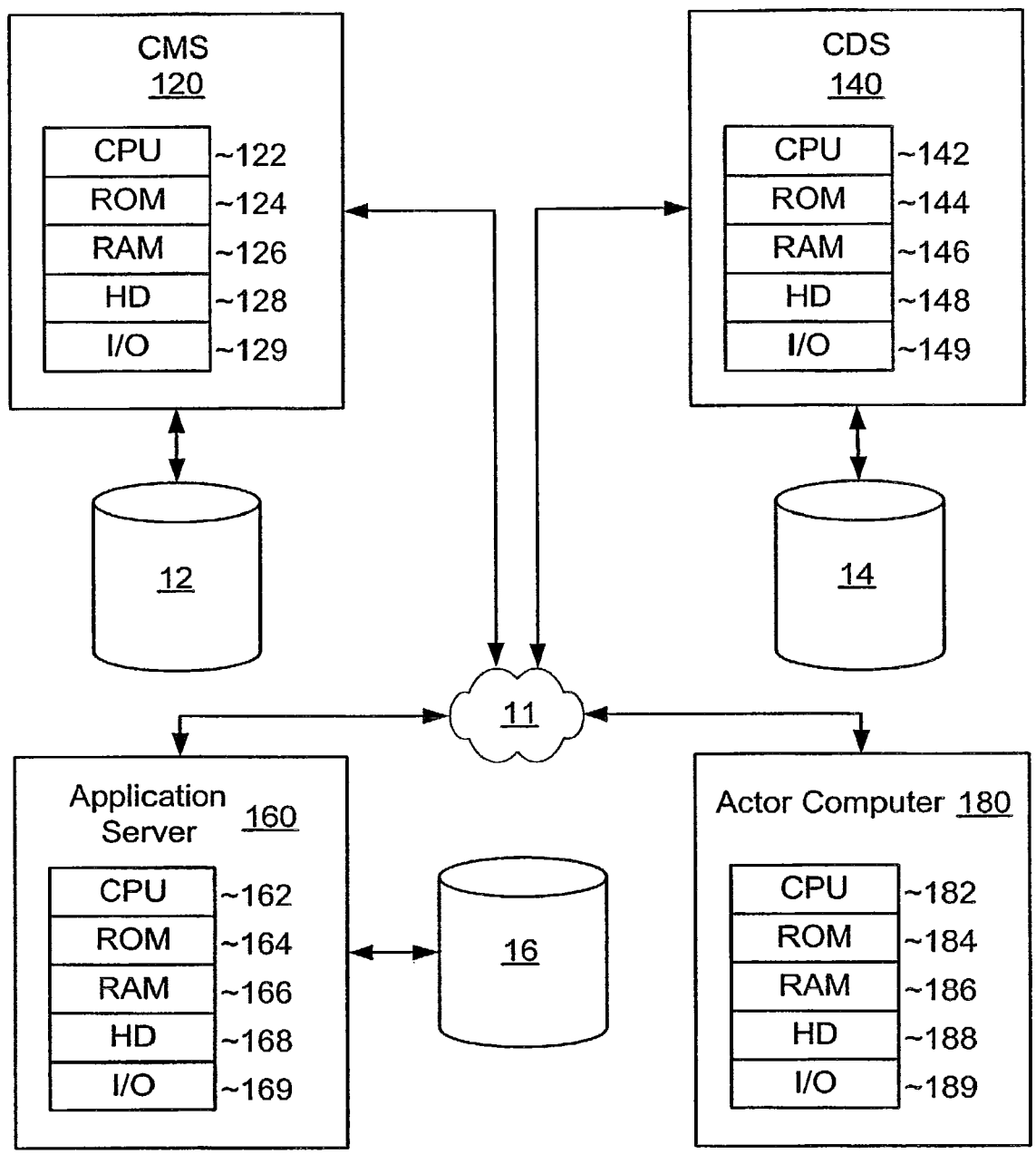
FIG. 1 includes an illustration of a hardware configuration of a network for performing a bulk operation in accordance with a specific, non-limiting embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Reference is now made in detail to the exemplary embodiments of the invention, examples of which are illustrated in the accompanying drawings. Wherever possible, the same reference numbers will be used throughout the drawings to refer to the same or like parts (elements).

Bulk operations on a large number of items may be processed by a computer without the likelihood of exceeding a timing or hardware limitation of a system. An instruction or its related information can be examined to determine if the instruction may potentially involve a large number of items. If so, the instruction may be passed to a bulk operations manager software component to determine the number of items involved. The bulk operations manager software component can break down the operation into smaller groups of items. Those smaller groups may be in the form of vectors that include identifiers for the object and sub-objects. The vectors can be the arguments upon which the operation may be performed. Ordering and policies may be examined before the creation of the groups to reduce the likelihood of an unnecessary error or warning message. The changes can be transparent to a developer writing code or a computer generating code to perform a specific operation.

A few terms are defined or clarified to aid in understanding the descriptions that follow. A network includes an interconnected set of server and client computers over a publicly available medium (e.g., the Internet) or over an internal (company-owned) system. A user at a client computer may gain access to the network using a network access provider. An Internet Service Provider ("ISP") is a common type of network access provider.

The term "content" is intended to mean any information to be transmitted over a network (e.g., data from a database, time of day from a computer's clock, etc.), a file, a software component, or the like that is distributed or redistributed (with or without modification) by or within a network site. For example, the content may be in the form of a network page or a file to be downloaded from a network site.

Each of the terms "object" and "software object" is intended to mean a self-contained entity as used in object-oriented programming. For example, a project, a file, and a link may each be an object. A "scalar object" is intended to mean an object that does not refer to any other object or record (has no sub-objects). An image file may be an example of a scalar object. A "composite object" is intended to mean an object that refers to any other object or record. A composite object may include database record(s), scalar object(s), other composite object(s), or any combination thereof.

The term "sub-object" is intended to mean any subdivision of a composite object. For example, a file object may be a sub-object of a project object because the file is used with the project. A sub-object may include other items that are not objects, such as a record within a database table. The term "software component" is intended to mean at least a portion of a computer program (i.e., a software application). Examples include a content delivery software component, a content management software component, or the like. Different software components may reside in the same computer program or in different computer programs on the same computer or different computers.

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited to only those elements but may include other elements not expressly listed or inherent to such method, process, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

Before discussing embodiments of the present invention, an exemplary hardware architecture for using embodiments of the present invention is described. FIG. 1 illustrates an exemplary architecture and includes content management system ("CMS") 120, content delivery system ("CDS") 140, application server 160, and actor computer 180 each bidirectionally coupled to internal network 11.

Each of CMS 120, CDS 140, and application server 160 is a server computer and is bidirectionally coupled to a corresponding database 12, 14, and 16, respectively. Each of databases 12, 14, and 16 may contain objects and metadata regarding those objects in tables within those databases. A database server (not shown) may lie between any one or more of the databases 12, 14, and 16 and the server computers 120, 140, and 160. More or fewer databases may be used, and a single database may be shared by more than one of server computers 120, 140, and 160.

For simplicity, the database server can be considered part of a database. Actor computer 180 is a client computer as the term is used in client-server relationships. Actor computer 180 can include a desktop computer, a laptop computer, a personal digital assistant, a cellular phone, or nearly other device capable of communicating over network 11. Other actor computers (not shown) may also be bidirectionally coupled to internal network 11. Individuals using the actor computers may include content developers, editors, content reviewers, webmasters, information technology specialists, and the like.

Within each of CMS 120, CDS 140, and application server 160, a plurality of computers (not shown) may be interconnected to each other over internal network 11 or a combination of internal and external networks. For simplification, a single system is shown for each of CMS 120, CDS 140, and application server 160. Other systems (e.g., page generator, etc.) may be part of CMS 120, CDS 140, application server 160, or additional systems that are bi-directionally coupled to internal network 11.

A plurality of other client computers similar to actor computer 180 may be bidirectionally coupled to network 11. Although not shown, a visitor computer, which is a client computer, may be bidirectionally coupled to the CDS 14 via an external network (e.g., the Internet, not shown in FIG. 1). Note that FIG. 1 is a simplification of a hardware configuration. Many other alternative hardware configurations are possible and known to skilled artisans.

The CMS 120 can include central processing unit ("CPU") 122, read-only memory ("ROM") 124, random access memory ("RAM") 126, hard drive ("HD") or storage memory 128, and input/output device(s) ("I/O") 129. I/O devices 129 can include a keyboard, monitor, printer, electronic pointing device (e.g., mouse, trackball, etc.), or the like. CDS 140 can include a server computer comprising CPU 142, ROM 144, RAM 146, HD 148, and I/O 149, and application server 160 can include a server computer comprising CPU 162, ROM 164, RAM 166, HD 168, and I/O 169. CDS 140 or CMS 160 may have one or more content delivery software components, a page generator software component, a content management software component, an applications software component, and the like. Actor computer 180 can comprise CPU 182, ROM 184, RAM 186, HD 188, and I/O 189.

Each of computers in FIG. 1 may have more than one CPU, ROM, RAM, HO, I/O, or other hardware components. For simplicity, each computer is illustrated as having one of each of the hardware components, even if more than one is used. The content, typically in the form of objects and database records, and its metadata, if any, may be located within any or all of CMS 120, CDS 140, application server 160, and databases 12, 14, and 16.

Each of the computers 120, 140, 160, and 180 is an example of a data processing system. ROM 124,144,164, and 184; RAM 126, 146, 166, and 186; HD 128,148, 168, and 188; and databases 12, 14, and 16 can include media that can be read by CPU 122, 142, 162, or 182. Therefore, each of these types of memories includes a data processing system readable medium. These memories may be internal or external to computers 120, 140, 160, or 180.

Figure 2:
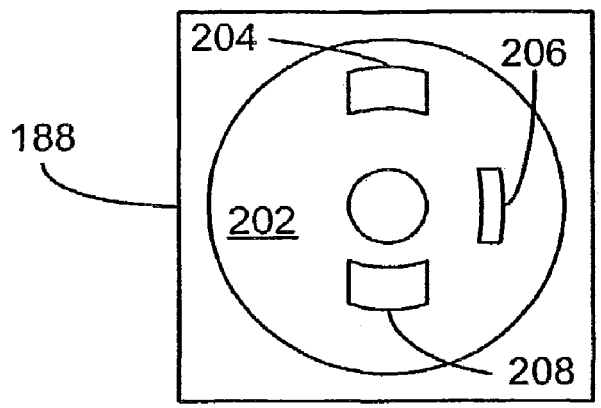
FIG. 2 includes an illustration of a data processing system storage medium including software code having instructions in accordance with an embodiment of the present invention.

Portions of the methods described herein may be implemented in suitable software code that may reside within ROM 124, 144, 164, or 184, RAM 126, 146, 166, or 186, or HD 128, 148, 168, or 188. In addition to those types of memories, the instructions in an embodiment of the present invention may be in the form of code contained on a data storage device with a different data processing system readable storage medium, such as a hard disk. FIG. 2 illustrates a combination of software code elements 204, 206, and 208 that are embodied within data processing system readable medium 202, on HD 188. Alternatively, the instructions may be stored as software code elements on a DASD array, magnetic tape, floppy diskette, optical storage device, or other appropriate data processing system readable medium or storage device.

In an illustrative embodiment of the invention, the computer-executable instructions may be lines of compiled C++, Java, or other language code. Other architectures may be used. For example, the functions of anyone of the computers may be performed by a different computer shown in FIG. 1. Additionally, a computer program or its software components with such code may be embodied in more than one data processing system readable medium in more than one computer.

In the hardware configuration above, the various software components (e.g., content delivery, page generator, content management, or the like) may reside on a single server computer or on any combination of separate server computers. In alternative embodiments, some or all of the software components may reside on the same server computer. For example, the content delivery software component and the page generator software component could reside on the same server computer.

Communications between any of the computers in FIG. 1 can be accomplished using electronic, optical, radio-frequency, or other signals. For example, when a user is at actor computer 180, actor computer 180 may convert the signals to a human understandable form when sending a communication to the user and may convert input from a human to appropriate electronic, optical, radio-frequency, or other signals to be used by, systems 120, 140, or 160. Similarly, when an operator is at CMS 120, its server computer may convert the signals to a human understandable form when sending a communication to the operator and may convert input from a human to appropriate electronic, optical, radio-frequency, or other signals to be used by actor computer 180 or systems 120, 140, or 160.

Figure 3:
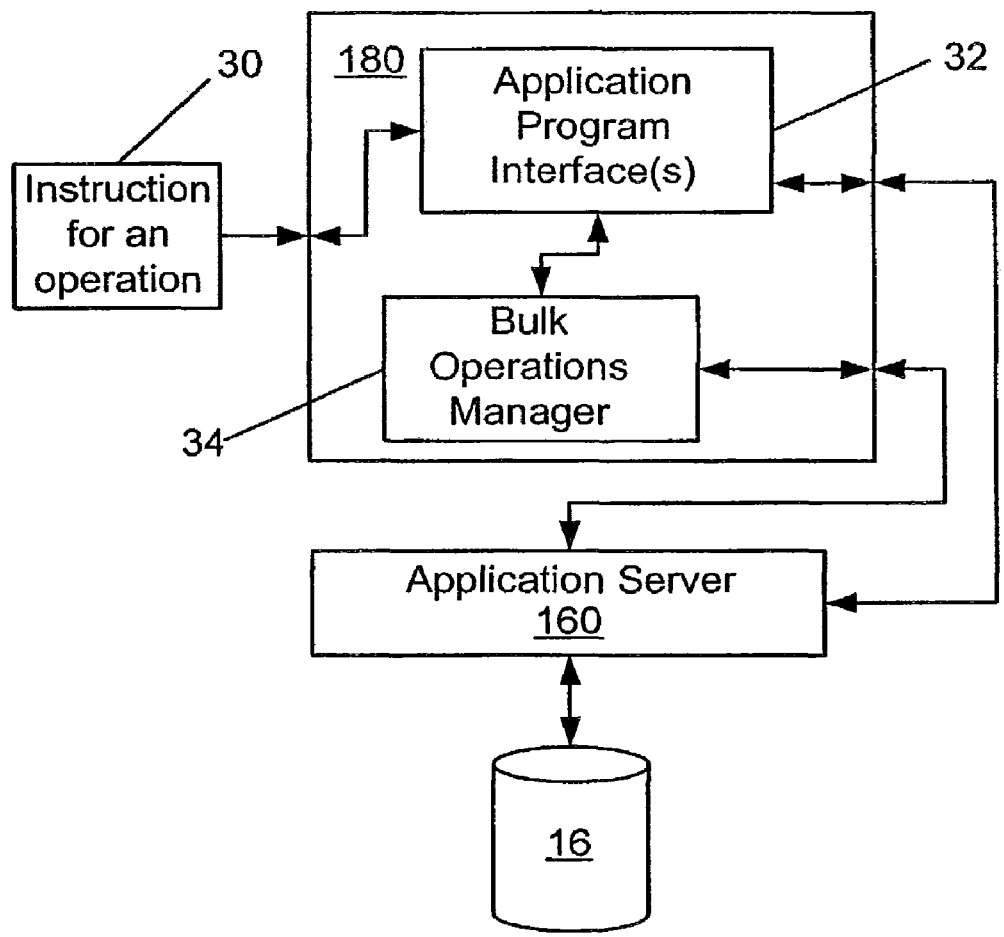
FIG. 3 includes an illustration of a hardware and software configuration illustrating operation of software components within a client computer and a server computer in accordance with an embodiment of the present invention.

FIG. 3 includes a hardware/software component relationship that may be used in an embodiment of the present invention. Actor computer 180 may be bidirectionally coupled to application server 160 (via network 11, which is not shown in FIG. 3). Actor computer 180 may include Application Program Interfaces 32 ("APIs") that are bidirectionally coupled to bulk operations manager 34. Each of APIs 32 and bulk operations manager 34 are software components. In alternative embodiments, APIs 32 and bulk operations manager 34 may physically reside on different computer(s), such as CMS 120 or application server 160.

Code written by an individual may be input into actor computer 180. FIG. 3 illustrates an incoming instruction for an operation (block 30). Alternatively, the code may be supplied by another software component within actor computer 180 or another computer. The instruction may involve anything from a scalar object to a composite object with a large number of sub-objects. APIs 32 within actor computer 180 may determine if an instruction should be sent to bulk operations manager 34 or application server 160. If the instruction bypasses bulk operations manager 34, application server 160 may process the instruction using a conventional technique. If the instruction is sent to bulk operations manager 34, it can break the instruction down into tasks involving smaller groups of sub-objects. The code for the tasks can be sent to the application server 160 which in turn can perform the tasks on the groups of sub-objects within database 16.

The operation may be performed with a reduced likelihood of failure due to a smaller number of items involved for each task. The method and system are flexible in handling nearly any number of sub-objects that may be involved with what would appear to be a relatively straightforward and simple instruction. From the perspective of an operator at actor computer 180 or other code being sent to APIs 32, the change in APIs 32 and the operation of the bulk operations manager 34 may be transparent. In other words, a single, straightforward instruction may be used regardless of the number of sub-objects involved and changes in hardware or other software components (other than APIs 32 and bulk operations manager 34) are not needed.

Figure 4:
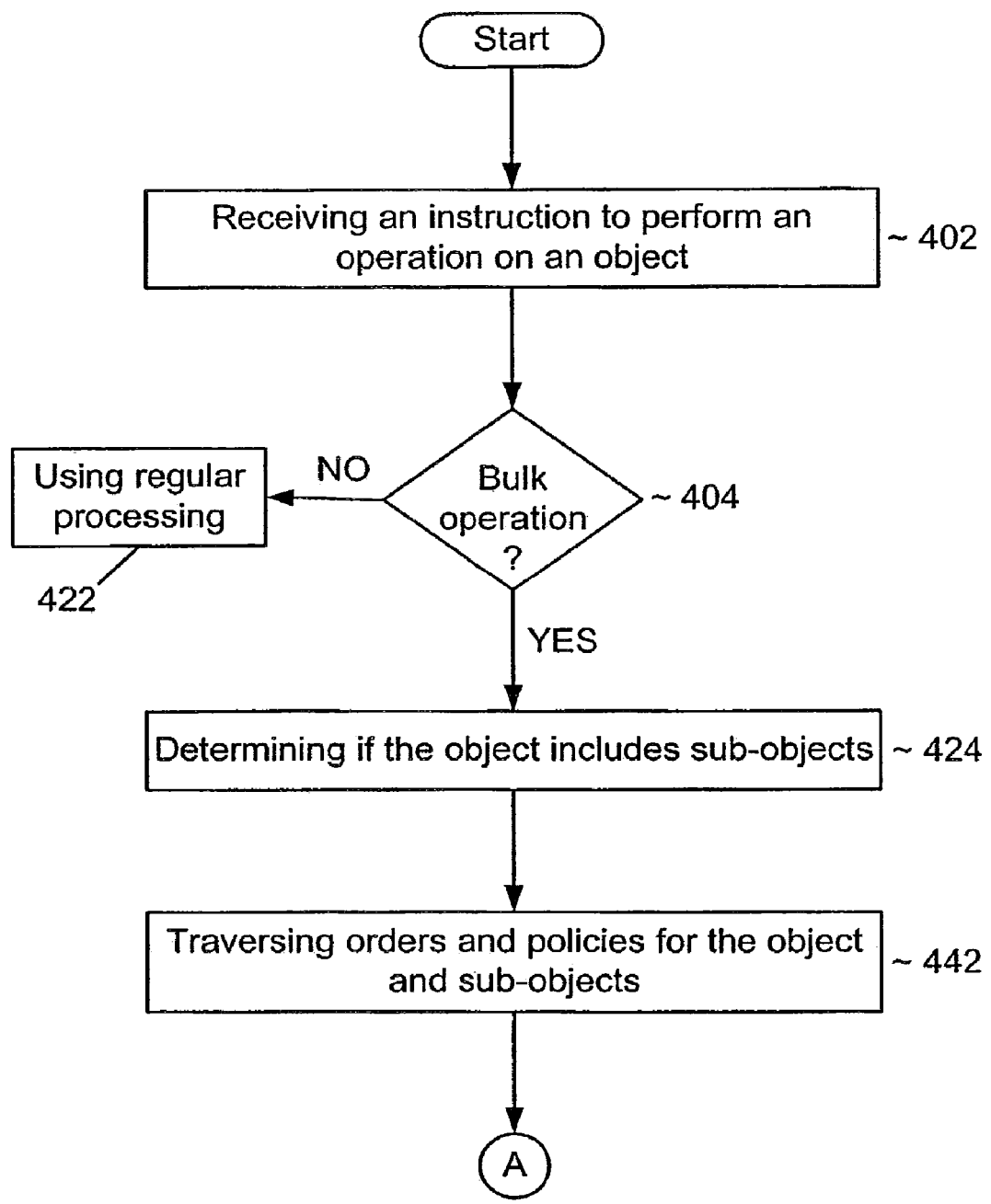
FIGS. 4-5 include a flow diagram of a method of performing a bulk operation in accordance with an embodiment of the present invention.
Figure 5:
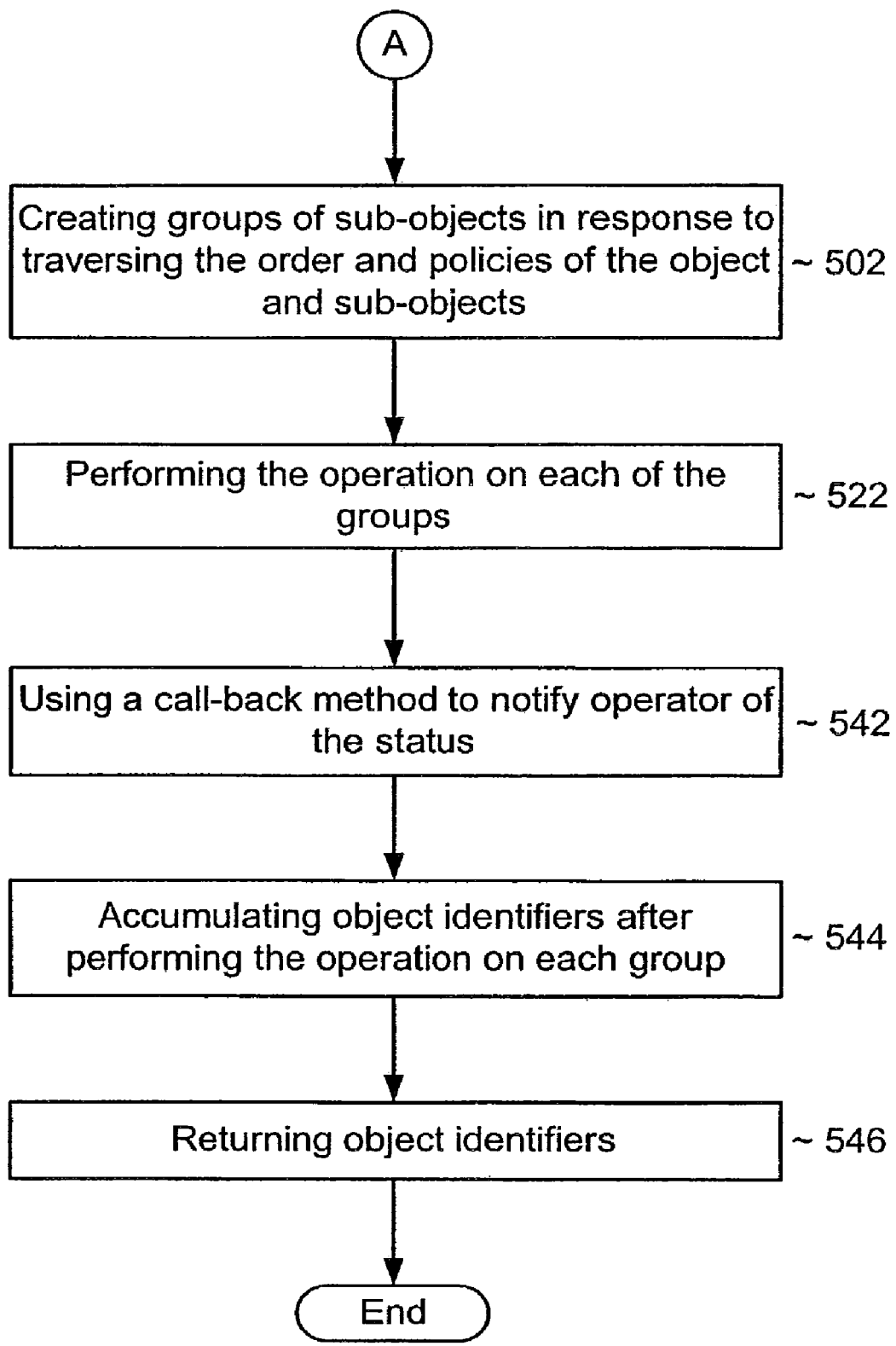

Attention is now directed to FIGS. 4-5 that include an exemplary process flow for performing operations on objects at a network site. The method can comprise receiving instruction to perform an operation on an object (block 402 in FIG. 4) and determining whether a bulk operation may be performed (diamond 404). If not a bulk operation, the method can comprise using regular processing (block 422). If a potential bulk operation may be performed, the method can comprise, determining if the object includes sub-objects (block 424), traversing orders and policies for the object and sub-objects (block 442), creating groups of sub-objects in response to traversing the order and policies of the object and sub-objects (block 502 in FIG. 5), performing the operation on each of the groups (block 522), using a call-back method to notify operator of the status (block 542), accumulating object identifiers after performing the operation on each group (block 544), and returning object identifiers (block 546).

Note that not all of the activities described in the process flow diagram are required, that a limitation within a specific activity may not be required, and that further activities may be performed in addition to those illustrated. Also, some of the activities may be performed substantially simultaneously during with other activities. After reading this specification, skilled artisans will be capable of determining what activities can be used for their specific needs.

Attention is now directed to details for performing operations. Referring to FIG. 4, the method can comprise receiving an instruction to perform an operation on an object (block 402). The instruction can be as simple as "promote ProjectID" or the like. In this specific example, ProjectID and all its sub-objects are to be promoted. In this example, promoting is used to mean that the object "ProjectID" is ready or eligible to be deployed. Note ProjectID may include many file objects or use records from one or more databases, each of which are sub-objects of ProjectID. Many other instructions could have been received.

The method can also comprise determining whether a bulk operation is to be performed (diamond 404). In content management for a network site, actions, such as creating, deleting, deploying, modifying, promoting, and the like, may be considered actions that may potentially involve many different sub-objects. Other actions may also involve many different sub-objects. Therefore, the list of actions that may trigger a determination of a potential bulk operation may be more or fewer than those listed.

The recognition of whether the operation is potentially a bulk operation and should invoke bulk operations manager 34 may be based on keyword, an abbreviated form of the keyword (e.g., "prm" if the promote instruction included "ProjectID.prm"), a flag, or other marker. The code within APIs 32 may be adapted to recognize any of the keywords, abbreviations, flags, or markers. If the operation is not identified as a potential bulk operation, the method can continue with regular (conventional) processing (block 422). Referring to FIG. 3, the instruction may go from APIs 32 to application server 160 and bypass bulk operations manager 34.

Conversely, if the instruction is identified as a potential bulk operation, APIs 32 may route the instruction to bulk operations manager 34 as illustrated in FIG. 3. In the prior example, APIs 32 may determine that the word "promote" is a potential bulk operation and forward the instruction to bulk operations manager 34. In this situation ("yes" branch from diamond 404 in FIG. 4), the method can include determining if the object includes sub-objects (block 424). If the object being processed by bulk operations manager 34 does not have any sub-objects, the instruction may be passed to application server 160 and processed.

Alternatively, if the object, such as ProjectID, includes at least one sub-object, the method can further comprise traversing orders and policies for the object and its subobjects (block 442). The relationships between the object and sub-objects and traversing orders and policies may be defined when the sub-objects are created. The non-limiting example below describes more detail when content for a network site is being developed.

When creating content, the content can be defined by a content type. The content types can include the classification of objects that make up the content. For example, a content type of "article" can include a title content type, a byline content type, an image content type, and a text content type. The title, byline, and image content types may be base content types, and the text content type may be a composite of other text content types. Therefore, an article object (instantiation of an article content type) can include four sub-objects.

Content (object) metadata may be generated and include relationship data between the objects managed by CMS 120. In one non-limiting embodiment, the information may be part of an XML data file having a particular schema. In other embodiments, different schemas may be used. After the XML data file is formed, CMS 120 can later read the XML data file to obtain information regarding relationship(s) between objects managed by CMS 120, database records, and potentially other information regarding the objects (e.g., annotations for policies (described later in this specification), updating frequency for the content item, etc.)

Alternatively, CMS 120 may include a software component that can distinguish between a scalar object that may have static information and does not reference another object and a composite object that references other object(s) or record(s). The reference may be in the form of a file name, a hyperlink, a reference to a database table, or the like. The software component can determine a relationship based on that information. For example, the software component can determine that the referenced objects will be child nodes compared to the current node (or the current object is a parent node to any objects to which it refers).

Using the XML data file or relationship information that the software component generates, a hierarchy with the object relationships can be constructed. Each object can be a node. The scalar objects that do not refer to another object may be the leaf nodes in the hierarchy. Database records may also be leaf nodes. From there, the next higher set of nodes can be constructed, and so on, until the hierarchical structure is completed. In other words, the hierarchy may be effectively built from the leaf nodes to branch nodes and eventually to a trunk or root. Alternatively, the hierarchy may be built in the reverse order after the relationships are determined.

When traversing the order and policies, bulk operations manager 34 can read the metadata and determine relationships between the objects and their sub-objects that are affected by the bulk operation. In the example of "promote ProjectID," bulk operations manager 34 can determine which objects and records are used in ProjectID by reading the XML data files for the objects to obtain the relationship information or examine other information present within objects (e.g., links, file names, records from databases, etc.) to determine relationships between the objects.

While the "promoting ProjectID" instruction may sound simple, many objects may reference other content objects. Therefore, promoting or demoting an object, such as ProjectID, may cause unintended complications that are undesired. For example, during promotion, the content object being promoted may refer to another content object that: (i) does not exist because it has previously been removed or never existed; (ii) includes information that may be outdated or stale, or (iii) cause other unintended consequences (premature release of sensitive information). Conversely, demoting a scalar object may cause other consequences for composite objects that include the scalar object.

Predefined actions, such as promoting, deleting, modifying, etc., may be set forth in annotations regarding policies within the content type definitions. Depending on the policy, different sets of objects may be significant or insignificant to a particular object based on the action being considered. Bulk operations manager 34 may review the policies to determine which sub-objects of ProjectID are affected by an instruction "promote ProjectID" and the order in which the ProjectID object and its sub-objects should be processed, if the order is important or desired.

Figure 6:
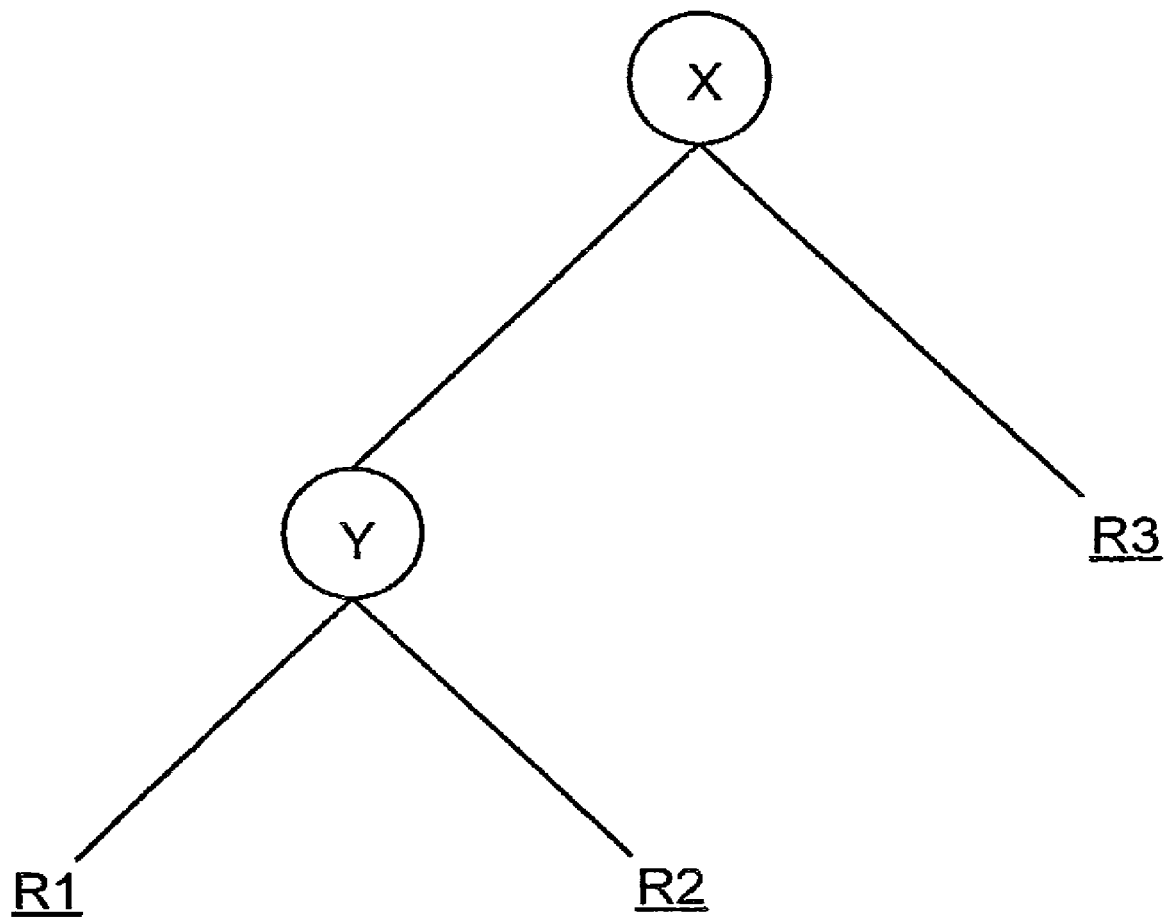
FIG. 6 includes an illustration of a hierarchy with the object relationships constructed according to one embodiment of the invention wherein the hierarchy depicts an object X having nested sub-objects, exemplifying the traversal of order and policies of objects and sub-objects affected by a bulk operation.

A delete instruction with an example may help to illustrate the traversal of order and policies. FIG. 6 includes an illustration of an object X that references object Y. Object Y references two database records R1 and R2. Object X also references database record R3. Therefore, object Y's sub-objects include records R1 and R2, and object X's sub-objects include object Y and records R1, R2, and R3. An instruction "delete ObjectX" may trigger bulk operations manager 34 by the word "delete." Bulk operations manager may examine the order to determine the hierarchy as shown in FIG. 6.

Bulk operations manager 34 may examine the policy that could state that sub-objects are to be deleted at the lowest level of the hierarchy and progress towards higher level objects. Referring to FIG. 6, the order of deletion may be R1, R2, Y, R3, and X. If object Y were deleted before record R1 or R2, an unnecessary system error or warning may be generated because R1 and R2 are leaf nodes to object Y.

The method can also comprise creating groups of sub-objects in response to traversing the order and policies of the object and sub-objects (block 502 in FIG. 5). The ordering of the object and sub-objects may result in over 10,000 items upon which action is to be taken. This activity can be performed to create smaller groups that are less likely to result in an error or other similar problem as previously described in a conventional system. For example, the instruction "promote ProjectID" may involve 30,000 items (ProjectIO object and its 29,999 sub-objects). The method can be performed to create 60 groups each having 500 sub-objects of ProjectID. More specifically, the instructions can include vectors of 500 identifiers corresponding to the sub-objects. One of the vectors will have the identifier of the object (ProjectID), itself. Therefore, the "promote ProjectIO" as input into APIs 32 can be converted by bulk operations manager 34 to 60 promote instructions each promoting 500 sub-objects of Project 10. The action on the ProjectID object itself may be performed during a first group, a last group, or anywhere in-between.

The method can further comprise performing the operation on each of the groups (block 522). In the promoting example, the 60 instructions can be sent from bulk operations manager 34 to application server 160. Each of the instructions may be performed in conventional manner by application server 160. Application server 160 may interact with database 16 or another database to promote the proper objects. The operation (e.g., promoting ProjectID) is more likely to execute to completion without a hardware or system error because more manageable numbers of items are being processed. Therefore, time-out, memory full, or other conditions are less likely to occur.

The method may still further comprise using a callback method to notify operator of the status (block 542). A significant amount of time may elapse before the operation is completed. During this time, an operator at actor computer 180 may want to monitor the status of the operation using a callback method. The callback method may be executed by bulk operations manager 34 as the instructions are processed by application server 160. A spreader bar (graphical status indicator) or numerical indicator ("J out of K items processed," where J is the actual number of items processed, and K is the total number of items) may be used so that the operator can monitor the progress of the operation.

The method may also comprise accumulating object identifiers after performing the operation on each group (block 544). Some operations, such as promoting or deploying, may have object identifiers generated as the corresponding objects are acted upon by application server 160. Bulk operations manager 38 may accumulate the object identifiers generated by application server 160. Other operations, such as delete, may not generate object identifiers, and therefore, no object identifiers will be accumulated.

The method may further comprise returning object identifiers (block 546), if any were generated. After accumulating the object identifiers, they can be sent from bulk operations manager 34 to APIs 32 or memory (e.g., HD 188, database 12, 14, or 16, etc.).

Note that activities in blocks 542, 544, and 546 are optional. At least a portion of the activities in blocks 542 and 544 may be performed while the operation on the groups is being performed (block 522).

Embodiments described herein may allow for a greater likelihood of success in performing an operation that involves a large number of items. The bulk operations manager 34 may receive code for an instruction, create groups for the object and its sub-objects, and generate code to perform the instruction for each of the groups. The method and system is scalable and can handle nearly any operation regardless of the number of objects and sub-objects involved. Because the number of objects and sub-objects involved for all operations cannot be known, changing software processing limits (CPU time-out conditions) or hardware (size of RAM or other memory) is not a good solution because it is not truly scalable.

Although references have been made to the object and sub-objects, some groups may only have objects at the same level or only sub-objects (e.g., database records) of higher level object(s). Also, the number of items to be included in a group may be defined by the user at actor computer 180. Another number, such as 100 or 1000 items, could be used instead of 500 items as in the prior example. As the number of items in the group decreases, the number of instructions generated by bulk operations manager 34 increases. As the number of items in the group increases, the likelihood of exceeding a software or hardware limitation of the system increases. After reading this specification, skilled artisans will be able to determine the size of the groups that fit their needs.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A computer program product comprising at least one non-transitory computer readable medium storing instructions translatable by at least one processor to implement a bulk operations manager, wherein the bulk operations manager is configured to:
   receive an instruction from an Application Program Interface (API), wherein the bulk operations manager is coupled to the API, wherein the instruction is for an application server to perform an operation on an object, wherein the operation is identified by the API as a potential bulk operation, and wherein the API and the bulk operations manager are software components residing on one or more server computers; and
   convert the instruction into a plurality of instructions to be processed by the application server, wherein the object is determined by the bulk operations manager to include a plurality of sub-objects, wherein each of the plurality of instructions comprises at least one sub-object of the object, wherein the object is a composite object, and wherein the at least one sub-object is a subdivision of the composite object.

2. A computer program product according to claim 1, wherein the bulk operations manager is further configured to execute a callback method as the plurality of instructions is being processed by the application server.

3. A computer program product according to claim 1, wherein the bulk operations manager is further configured to accumulate object identifiers that are generated by the application server as the plurality of instructions is being processed by the application server.

4. A computer program product according to claim 3, wherein the bulk operations manager is further configured to send the object identifiers to the API or a memory.

5. A computer program product according to claim 1, wherein the bulk operations manager is further configured to traverse orders and policies for the object and the plurality of sub-objects.

6. A computer program product according to claim 5, wherein the orders and policies are defined when the plurality of sub-objects is created.

7. A computer program product according to claim 5, wherein the plurality of instructions is created in response to the traversing orders and policies for the object and the plurality of sub-objects.

8. A computer program product according to claim 1, wherein the bulk operations manager is further configured to determine relationships between the object and the plurality of sub-objects of the object.

9. A computer program product according to claim 8, wherein the bulk operations manager is further configured to construct a hierarchy with the relationships between the object and the plurality of sub-objects of the object.

10. A computer program product according to claim 1, wherein the bulk operations manager is further configured to pass the instruction to the application server when the object is determined by the bulk operations manager to not include any sub-objects.

11. A computer system, comprising:
at least one processor; and
at least one non-transitory computer readable medium storing instructions translatable by the at least one processor to implement a bulk operations manager, wherein the bulk operations manager is configured to:
receive an instruction from an Application Program Interface (API), wherein the bulk operations manager is coupled to the API, wherein the instruction is for an application server to perform an operation on an object, wherein the operation is identified by the API as a potential bulk operation, and wherein the API and the bulk operations manager are software components residing on one or more server computers; and
convert the instruction into a plurality of instructions to be processed by the application server, wherein the object is determined by the bulk operations manager to include a plurality of sub-objects, wherein each of the plurality of instructions comprises at least one sub-object of the object, wherein the object is a composite object, and wherein the at least one sub-object is a subdivision of the composite object.

12. A system according to claim 11, wherein the bulk operations manager is further configured to execute a callback method as the plurality of instructions is being processed by the application server.

13. A system according to claim 11, wherein the bulk operations manager is further configured to accumulate object identifiers that are generated by the application server as the plurality of instructions is being processed by the application server.

14. A system according to claim 13, wherein the bulk operations manager is further configured to send the object identifiers to the API or a memory.

15. A system according to claim 11, wherein the bulk operations manager is further configured to traverse orders and policies for the object and the plurality of sub-objects.

16. A system according to claim 15, wherein the orders and policies are defined when the plurality of sub-objects is created.

17. A system according to claim 15, wherein the plurality of instructions is created in response to the traversing orders and policies for the object and the plurality of sub-objects.

18. A system according to claim 11, wherein the bulk operations manager is further configured to determine relationships between the object and the plurality of sub-objects of the object.

19. A system according to claim 18, wherein the bulk operations manager is further configured to construct a hierarchy with the relationships between the object and the plurality of sub-objects of the object.

20. A system according to claim 11, wherein the bulk operations manager is further configured to pass the instruction to the application server when the object is determined by the bulk operations manager to not include any sub-objects.

* * * * *